United States Patent
Baldawa

(10) Patent No.: US 12,335,087 B2
(45) Date of Patent: Jun. 17, 2025

(54) NEGATIVE CACHING FOR EVENT NOTIFICATIONS

(71) Applicant: Amazon Technologies, Inc., Seattle, WA (US)

(72) Inventor: Rishi Baldawa, Vancouver (CA)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 17/813,894

(22) Filed: Jul. 20, 2022

(65) Prior Publication Data

US 2022/0360487 A1  Nov. 10, 2022

Related U.S. Application Data

(63) Continuation of application No. 16/910,013, filed on Jun. 23, 2020, now Pat. No. 11,398,943.

(51) Int. Cl.
*H04L 41/0604* (2022.01)
*H04L 67/5682* (2022.01)

(52) U.S. Cl.
CPC ...... *H04L 41/0613* (2013.01); *H04L 67/5682* (2022.05)

(58) Field of Classification Search
None
See application file for complete search history.

(56) References Cited

U.S. PATENT DOCUMENTS

| | | | |
|---|---|---|---|
| 11,398,943 B1 | 7/2022 | Baldawa | |
| 2003/0200197 A1 | 10/2003 | Long et al. | |
| 2004/0019651 A1* | 1/2004 | Andaker | H04L 51/212 709/207 |
| 2004/0176072 A1* | 9/2004 | Gellens | H04L 67/04 455/414.1 |
| 2007/0027956 A1* | 2/2007 | Castell | H04L 51/04 709/206 |
| 2008/0162485 A1 | 7/2008 | Long et al. | |
| 2008/0175240 A1 | 7/2008 | Suzuki | |
| 2010/0132029 A1 | 5/2010 | Chauhan et al. | |
| 2010/0332680 A1* | 12/2010 | Anderson | H04L 61/4511 709/245 |
| 2011/0047228 A1 | 2/2011 | Balasaygun | |
| 2013/0346600 A1 | 12/2013 | Massey et al. | |
| 2015/0058676 A1* | 2/2015 | Boger | G06F 11/3006 714/39 |
| 2015/0149630 A1* | 5/2015 | Atkins | G06F 11/3062 709/226 |
| 2015/0281156 A1* | 10/2015 | Beausoleil | H04L 51/212 709/206 |
| 2016/0065517 A1* | 3/2016 | Beausoleil | H04L 51/214 709/206 |

(Continued)

*Primary Examiner* — Joshua Joo
(74) *Attorney, Agent, or Firm* — Knobbe Martens Olson & Bear LLP

(57) ABSTRACT

Technology is described for receiving an event notification produced by a source service. A negative cache may be searched for a cache entry for the event notification. The negative cache may be determined to not include the cache entry for the event notification. The event notification may be determined to satisfy a filter rule included in a filter rules table, which may indicate that the event notification is useful information for a destination service. The event notification may be transmitted to the destination service.

20 Claims, 10 Drawing Sheets

(56) References Cited

U.S. PATENT DOCUMENTS

| | | | |
|---|---|---|---|
| 2016/0197772 A1* | 7/2016 | Britt | G08C 17/02 |
| | | | 370/254 |
| 2018/0123950 A1* | 5/2018 | Garg | H04L 63/0236 |
| 2018/0124590 A1 | 5/2018 | O'Connell et al. | |
| 2018/0321993 A1* | 11/2018 | McClory | H04L 41/5041 |
| 2018/0351898 A1* | 12/2018 | Lindeman | H04L 51/046 |
| 2019/0188279 A1 | 6/2019 | Christiansen et al. | |
| 2019/0207891 A1* | 7/2019 | Sedan | H04L 65/10 |
| 2019/0319909 A1 | 10/2019 | Lawson et al. | |
| 2020/0213180 A1* | 7/2020 | Pawaskar | H04L 41/0604 |

* cited by examiner

… (1)

NEGATIVE CACHING FOR EVENT NOTIFICATIONS

CROSS-REFERENCE TO RELATED APPLICATIONS

This application is a continuation of U.S. patent application Ser. No. 16/910,013, entitled "NEGATIVE CACHING FOR EVENT NOTIFICATIONS" and filed on Jun. 23, 2020, which is hereby incorporated by reference herein in its entirety under 37 CFR 1.57.

BACKGROUND

A service provider environment may provide a wide variety of services that are useful for customers. For example, a service provider environment may provide a compute service to process customer data, a storage service or a database service to store customer data, a machine learning service to build machine learning models using customer data, networking services for data transfer, etc. Such services may generate event notifications when a system state has changed, such as in response to changes in compute or storage resources. For example, a service may generate an event notification when a state of a computing instance changes from pending to running, or another service may generate an event notification when a computing instance is launched or terminated.

In one example, event notifications may be sent (e.g., as a stream of event notifications) from a source service operating in the service provider environment to a target service operating in the service provider environment or outside the service provider environment. The event notifications may travel between the source service and the target service via a series of hardware components in the service provider environment, such as routers, load balancers, physical hosts, etc. and software components in an overlay network. In another example, the target service may be an analytics service that receives the event notifications and performs an analysis using the event notifications. Thus, in some cases, the target service may use the event notification to perform an action, but in other cases, the target service may not perform an action based on the event notification.

DETAILED DESCRIPTION

Figure 1:
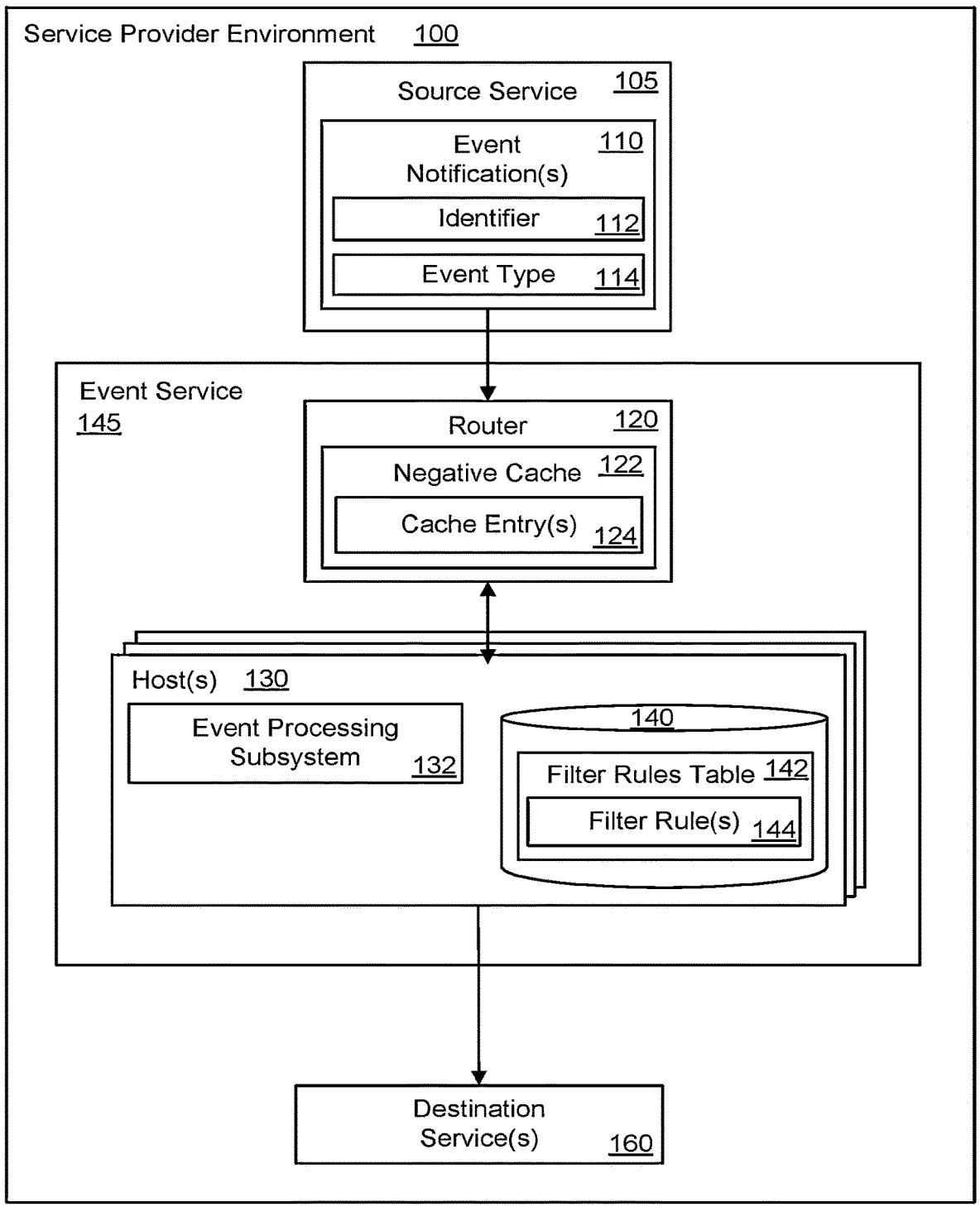
FIG. 1 illustrates a system and related operations for determining whether to drop an event notification at a router based on a presence of a cache entry for the event notification in a negative cache of the router according to an example of the present technology.

Technologies are described for processing event notifications received from service(s) operating in a networked computing environment. The event notifications may be messages received from the service(s). For example, services may execute in a service provider environment. As an example, an event notification may indicate a change in state that occurs to a user environment operating in the service provider environment. As another example, the event notification may indicate that an action was performed using a storage resource, computing resource, network resource, etc. of a source service in the service provider environment. For example, the event notification may indicate that data has been retrieved or accessed from a data store of a storage service in response to a read request. The event notification may be received and a negative cache may be searched or checked to determine whether a cache entry has been created for the event notification. The event notification may be dropped when the negative cache includes the cache entry for the event notification, which may reduce a network, storage and/or processing load at a recipient system or in the service provider environment. Alternatively, the event notification may be routed to a destination (e.g., a target service in the service provider environment, a computing instance, a code function, etc.) when the negative cache does not include the cache entry for the event notification.

In one configuration, a computing node may identify an event notification produced by a source service operating in the service provider environment. The event notification may be generated in response to a change in a system state in a user environment, such as a change to compute or storage resources in the user environment. Alternatively, the event notification may be response to a request for information. The event notification may be associated with an account, identifier (e.g., an account identifier or generated identifier), an event type and/or a geographic location.

In one example, the computing node may be a router in the service provider environment, and the router may receive the event notification from the service. In another example, the computing node may be a host in an event service (or another service or application) in the service provider environment, and the host may receive the event notification from the service. The host may be a physical host or a virtualized host. In yet another example, the computing node may be included in the service operating in the service provider environment. In response to receiving the event notification, the computing node may search a negative cache for a cache entry for the event notification. For example, the negative cache may be associated with the computing node or be accessible to the computing node, and the computing node may search the negative cache to determine a presence of the cache entry for the event notification.

In one example, the computing node may determine that the negative cache does not include the cache entry for the event notification. For example, the computing node may search the negative cache for the cache entry and determine when no cache entry for the event notification is present in the negative cache. In one example, when the cache entry for the event notification is not included in the negative cache, the computing node may determine whether the event notification satisfies a filter rule included in a filter rules table. For example, the filter rules table may include a plurality of filter rules, and the computing node may determine whether the event notification satisfies one or more filter rules included in the filter rules table for the identifier, the event type and/or the geographic location.

Depending on whether the event notification satisfies a filter rule, the computing node may perform one of two actions. In one action, the computing node may determine that the event notification does not satisfy a filter rule included in the filter rules table, which may occur when the event notification is considered wasteful. For example, the event notification may not satisfy a filter rule when the event notification is not expected to be used at a destination (e.g., a target service), and as a result, a transmission of the event notification to the destination may unnecessarily increase a network load, storage load and/or computing load in the target service or the service provider environment. In the case that the event notification does not satisfy a filter rule, the computing node may update or populate the negative cache to include the cache entry for the event notification. A presence of the cache entry in the negative cache may indicate that the event notification is wasteful. The cache entry may be stored in the negative cache until a timeout period (e.g., 5 seconds to a number of minutes) has expired, at which point the cache entry may be removed from the negative cache.

In a second alternative action, the computing node may determine that the event notification satisfies a filter rule included in the filter rules table, which may occur when the event notification is considered to be useful information for a destination (e.g., a target service) in destination computing system or the service provider environment. For example, the event notification may satisfy a filter rule when the event notification is expected to be used at the destination, and as a result, a transmission of the event notification would not unnecessarily increase a network load, storage load, computing load, etc. in the service provider environment. In the case that the event notification satisfies a filter rule, the computing node may transmit the event notification to a destination service or target service that uses or consumes the event notification.

In an alternative configuration, the computing node may search the negative cache for the cache entry for the event notification, and the computing node may determine that the negative cache includes the cache entry for the event notification. For example, the cache entry may have been previously created for inclusion in the negative cache when an earlier received event notification associated with a same identifier, event type and/or geographic location did not satisfy a filter rule included in a filter rules table, thereby indicating that the earlier received event notification was wasteful. In this case, the computing node may infer that the event notification currently received is wasteful due to the presence of the cache entry in the negative cache for the earlier received event notification, and in response, the computing node may drop the event notification. If the destination were to receive the event notification, the destination may simply drop the event notification without using the event notification to satisfy an objective, so transmitting the event notification to the destination may unnecessarily increase a network load, storage load, computing load, etc. in the service provider environment. By dropping the event notification at the computing node, the network load, storage load, computing load, etc. of the destination computing system(s) may be reduced.

FIG. 1 illustrates an example of a system and related operations for determining whether to drop an event notification 110 at a router 120 based on a presence of a cache entry 124 for the event notification 110 in a negative cache 122 of the router 120. The term "drop" as used in this discussion may mean that the event notification 110 is blocked, discarded, erased or not sent to another node on the message route. The router 120 may drop the event notification 110, or alternatively, the router 120 may route the event notification 110 to a host 130, which may direct the event notification 110 to one or more destination services 160 in the service provider environment. A destination service 160 may include a target service that runs a computing instance or a code function, etc. In some cases, the router 120 may be replaced with a load balancer, data switch or a similar type of data routing device.

As a non-limiting example, the event notification 110 may be an indication that a customer has drawn a certain amount of money from an automated teller machine (ATM), where the amount of money withdrawn may exceed a defined threshold. In other words, an act by the consumer of withdrawing the money exceeding the defined threshold from the ATM may cause the event notification 110 to be generated. In some cases, the event notification 110 may be transmitted to a destination service 160, such as a fraud detection service.

In one example, a source service 105 in a service provider environment 100 may generate the event notification 110. The event notification 110 may be generated in response to a change in a system state in a user environment, such as a change to resources (e.g., compute resources, networking resource, or storage resources) in the user environment. The event notification 110 may be associated with an identifier 112, such as an account identifier, application identifier, service identifier or a generated identifier. The identifier 112 may also be associated with the user environment. In other words, a particular user that uses the resources in the user environment may be assigned the identifier 112, and event notifications 110 that are generated due to changes in the user environment may be associated with the identifier 112. The event notification 110 may be further associated with an event type 114. The event type 114 may describe, identify or define the event notification 110. For example, the event type 114 may indicate that the event notification 110 is related to a computing instance being launched, a computing instance being terminated, a storage instance transitioning from a pending state to a running state, etc. The event notification 110 may be further associated with a geographic location, such as a geographic location associated with the resources in the user environment.

In another example, the event notification 110 may be generated in response to an action performed in a service in the service provider environment 100. For example, the event notification 110 may be generated when data is accessed from a data store of a storage service, where the data may be accessed in response to a read request. In another example, the event notification 110 may be generated when a processing action is performed on a computing instance running in the service provider environment 100.

In one example, the source service 105 may transmit event notifications 110 to the router 120, and the event notifications 110 may be intended for destination services 160 (or target services) in the service provider environment 100. The router 120 may filter the event notifications 110 received from the source service 105 using negative caching, such that the router 120 may only forward event notifications 110 to the destination services 160 when certain conditions are met. In one example, the router 120 may determine to drop certain event notifications 110 using the negative caching approach when the event notifications 110 are not useful for the intended destination service 160. For example, when a destination service 160 that receives the event notification 110 is known to simply discard the event notification 110 without performing an action or task using the event notification 110, the router 120 may drop the event notification 110 (i.e., not send the event notification 110 to the destination service 160) as defined by a negative rule in the negative cache 122. In another example, the router 120 may determine to transmit certain event notifications 110 when the event notifications 110 are defined as useful for the intended destination service 160. For example, when a destination service 160 that receives the event notification 110 performs an action or task using the event notification 110, the router 120 may transmit the event notification 110 to the destination service 160 because no negative rule will exist in the negative cache 122 in that case.

In one configuration, the router 120 may receive the event notification 110 from the source service 105. The router 120 may search the negative cache 122 associated with the router 120 to determine whether the negative cache 122 includes a cache entry 124 for the event notification 110. The router 120 may determine that the negative cache 122 does not include the cache entry 124 for the event notification 110, and the router 120 may identify a host 130 in the event service 145 in the service provider environment 100. The router 120 may be included in an event service 145 that operates in the service provider environment 100. The router 120 may send the event notification 110 to the host 130. In one example, the router 120 may not directly send the event notification 110 to the host 130, but rather the router 120 may send the event notification 110 to another load balancer or other device(s), which in turn may forward the event notification 110 to the host 130.

The host 130 may include an event processing subsystem 132 and other applications, modules, processes, systems, engines, or functionality not discussed in detail herein. The event processing subsystem 132 may receive the event notification 110 and identify filter rules 144 in a filter rules table 142 stored in a data store 140. The event processing subsystem 132 may determine whether the event notification 110 satisfies one or more filter rules 144 in the filter rules table 142 for the identifier 112 and/or the event type 114. In one specific example, the event notification 110 may satisfy one or more filter rules 144 when the event notification 110 matches the one or more filter rules 144. The filter rules 144 may be created or defined by an administrator or a user of the user environment 116 for the identifier 112 and/or the event type 114. For example, filter rules 144 for the event notification 110 may be created or defined when the event notification 110 is expected to be used by a destination service 160. As an example, when event notification 110 associated with a certain identifier 112 and/or a certain event type 114 are expected to be useful, corresponding filter rules 144 may be created such that a received event notification 110 associated with that identifier 112 and/or event type 114 may satisfy the created filter rules 144. On the other hand, no filter rules 144 may be created or defined for the event notification 110 associated with the identifier 112 and/or event type 114 when the event notification 110 is not expected to be used by a destination service 160. In other words, for event notifications 110 that are simply discarded by a destination service 160 after receipt, no filter rules 144 may be created.

In one example, filter rules 144 may be created for event notifications 110 that fall under a certain category or type or by geographic region, regardless of the identifier 112 associated with the event notifications 110. As a non-limiting example, filter rules 144 (or a lack of filter rules 144) may be defined for event notifications 110 related to storage events, which may not be used at the destination services 160. As another example, filter rules 144 (or a lack of filter rules 144) may be defined for event notifications 110 that generated from a specific geographic region. In another example, filter rules 144 may be defined based on the identifier 112 and not based on the event type 144 or geographic region.

In one example, filter rules 144 may be created for event notifications 110 that are generated by certain source services that operate in the service provider environment 100. For example, a first filter rule may be created for event notifications 110 received from a first source service, a second filter rule may be created for event notifications 110 received from a second source service, and so on. In another example, filter rules 144 may be created based on rules within an account. For example, the filter rules 144 may not filter out all event notifications 110 associated with an account, but rather may filter certain event notifications 110 associated with the account based on the rules within the account. In yet another example, filter rules 144 may be created for event notifications 110 based on a time of day. For example, if an event notification 110 is generated at a certain time of day, the event notification 110 may be dropped or not dropped depending on the filter rules 144 that are created for the time of day. In a further example, filter rules 144 may be created that define that a certain percentage of event notifications 110 or a certain number of event notifications 110 per a defined time period are to be dropped based on current traffic conditions in the service provider environment 100.

In one configuration, the event processing subsystem 132 may store the event notification 110 in a table or other data structure included in the data store 140. The event processing subsystem 132 may determine that the event notification 110 satisfies a filter rule 144 in the filter rules table 142. The event notification 110 may satisfy a filter rule 144 in the filter rules table 142 for the identifier 112 or the event type 114. In this configuration, the event notification 110 may be transmitted to the destination service 160. As an example, the destination service 160 may be an analytics service that performs analytics on the event notifications 110. As another example, the destination service 160 may execute a code function that consumes the event notifications 110, or the destination service 160 may be another type of service that uses or consumes the event notifications 110.

In one example, the filter rules 144 in the filter rules table 142 may be updated over time. For example, the filter rules table 142 may be updated such that a subsequently received event notification 110 associated with the identifier 112 and/or the event type 114 may satisfy a filter rule 144 included in the filter rules table 142 for the identifier 112 and/or the event type 114. Thus, the filter rules table 144 may be updated such that event notifications 110 associated with certain identifiers 112 and/or event types 114 that were previously dropped may later be allowed or vice versa.

In further operation, the event processing subsystem 132 may determine that the event notification 110 does not satisfy a filter rule 144 in the filter rules table 142. The event notification 110 may not satisfy a filter rule 144 in the filter rules table 142 for the identifier 112 or the event type 114. In this configuration, the event processing subsystem 132 may send an acknowledgement message to the router 120 indicating that the event notification 110 does not satisfy a filter rule 144 in the filter rules table 142. The router 120 may add or create the cache entry 124 for inclusion in the negative cache 122, where a presence of the cache entry 124 in the negative cache 122 may indicate that the event notification 110 associated with the identifier 112 or the event type 114 does not satisfy a filter rule 144 in the filter rules table 142. In other words, the router 120 may populate the negative cache 122 with the cache entry 124. In a specific example, the acknowledgement message may be a response header that includes a key, and the router 120 may add the key as the cache entry 124 in the negative cache 122. The negative cache 122 may be populated with the cache entry 124 based on a response of an application programming interface (API) call to the event service 145. The key may a hash value or a coded value, if desired. The response header may serve as a warning code when the event notification 110 does not satisfy a filter rule 144.

The presence of the cache entry 124 in the negative cache 122 may cause the router 120 to drop certain event notifications 110 received later in time. For example, at a later point in time (e.g., 10 seconds later), the router 120 may receive a subsequent event notification 110 associated with a same identifier 112 or event type 114 as compared to the event notification 110 received earlier. The router 120 may search the negative cache 122 and determine the presence of the cache entry 124 in the negative cache 122. As a result, the router 120 may drop the subsequent event notification 110. In other words, the router 120 may know that the subsequent event notification 110 is not useful for the destination service 160, so the subsequent event notification 110 may be dropped or blocked immediately at the router 120 without sending the subsequent event notification 110 through the host(s) 130, which may unnecessarily increase a network load, storage load, processing load, etc. in the service provider environment 100.

In one example, the router 120 may not receive an acknowledgement message indicating that the event notification 110 does not satisfy a filter rule 144 in the filter rules table 142, but rather the router 120 may use machine learning or similar techniques to learn over a period of time certain types of event notifications 110 that are wasteful (e.g., event notifications 110 that are not used by destination services 160). In this example, the router 120 may not receive explicit messages indicating that certain event notifications 110 are not useful, but rather may infer that certain event notifications 110 should be dropped based on a machine learning model built using historical and/or training data, pattern recognition, etc.

In one example, the cache entry 124 may exist in the negative cache 122 for a certain period of time. For example, after a timeout period for the cache entry 124 has expired, the cache entry 124 may be removed from the negative cache 122. The timeout period may be a configurable value. As non-limiting examples, the timeout period may be a fraction of a second, a second, a few seconds, a minute, a few minutes, etc. The timeout period for the cache entries 124 may be set to a fixed duration because the filter rules 144 may be updated by the user or the administrator of the user environment 116 over time. For example, certain event notifications 110 may initially not be useful to a destination service 160, but at a later point in time, such event notifications 110 may be useful and new filter rule(s) 144 may be created for the event notifications 110. By periodically clearing the negative cache 122 of stale cache entries 124, event notifications 110 that are supposed to be sent to destination service(s) 160 based on new filter rule(s) 144 may not be mistakenly dropped by the router 120.

In the past, the router 120 may have received event notifications 110 from the source service 105 and automatically transmitted the event notifications 110 to the host 130. The event notifications 110 may have been subsequently transmitted to the destination services 160. In the past, the router 120 may have automatically transmitted the event notifications 110 to the destination services 160, regardless of whether the event notifications 110 were not used, dropped or discarded at the destination services 160 without using the event notifications 110. Generally speaking, a relatively high percentage of the event notifications 110 (e.g., 95% of the event notifications 110) generated at the source service 105 may not be used at the destination services 160, so the automatic transmission of the event notifications 110 from the router 120 may unnecessarily increase a network load, storage load, processing load, etc. in the service provider environment 100 or other computing environment. For example, the automatic transmission of the event notifications 110 may increase resource utilization at the hosts 130 the destination service 160, etc., even when the event notifications 110 are discarded without use at the destination service 160. Thus, in the past, the hosts 130, the destination service 160, etc. may be overloaded by processing unused event notifications 110.

In the present technology, the router 120 may receive event notifications 110 from the source service 105 and compute a decision on whether to forward the event notifications 110 to the destination services 160. More specifically, the router 120 may search the negative cache 122 to determine whether cache entries 124 have already been created for the event notifications 110. When the negative cache 122 includes the cache entries 124, the router 120 may determine to not forward the event notifications 110 to the destination services 160 and drop the event notifications 110. In other words, the presence of the cache entries 124 may indicate to the router 120 that the event notifications 110 are not useful and may unnecessarily increase the resource utilization in the service provider environment 100 or computing system(s), and as a result, the router 120 may drop the event notifications 110.

On the other hand, when the negative cache 122 does not include cache entries 124 for the event notifications 110, the router 120 may know that the event notifications 110 are useful to the destination services 160, and as a result, the router 120 may transmit the event notifications 110 to the destination services 160 via other components in the event service 145. By implementing a negative caching approach, the router 120 may reduce network usage, computation usage, storage usage and/or overall resource utilization when processing the event notifications 110 received from the source service 105.

Further, in the present technology, by implementing negative caching, the service provider environment 100 may be able to handle an increased amount of data traffic, such as event notifications 110. By dropping unused event notifications 110 at the router 120 instead of transmitting the unused event notifications 110 through the service provider environment 100 (e.g., filtering event notifications 110 at an earlier stage in the service provider environment 100) or another underlying computing environment, less bandwidth and network resources may be consumed for unused event notifications 110, so overall the service provider environment 100 may be able to handle the increased amount of data traffic, such as event notifications 110.

The various processes and/or other functionality contained within the service provider environment 100 may be executed on one or more processors that are in communication with one or more memory modules. The service provider environment 100 may include a number of computing devices that are arranged, for example, in one or more server banks or computer banks or other arrangements. The computing devices may support a computing environment using hypervisors, virtual machine managers (VMMs) and other virtualization software.

The term "data store" may refer to any device or combination of devices capable of storing, accessing, organizing and/or retrieving data, which may include any combination and number of data servers, relational databases, object oriented databases, cluster storage systems, data storage devices, data warehouses, flat files and data storage configuration in any centralized, distributed, or clustered environment. The storage system components of the data store may include storage systems such as a SAN (Storage Area Network), cloud storage network, volatile or non-volatile RAM, optical media, or hard-drive type media. The data store may be representative of a plurality of data stores as can be appreciated.

In one configuration, the source service 105, the router 120, the hosts 130 and the destination services 160 may communicate with each other over a network. The network may include any useful computing network, including an intranet, the Internet, a localized network, a wide area network, a wireless data network, or any other such network or combination thereof. Components utilized for such a system may depend at least in part upon the type of network and/or environment selected. Communication over the network may be enabled by wired or wireless connections and combinations thereof.

Figure 2:
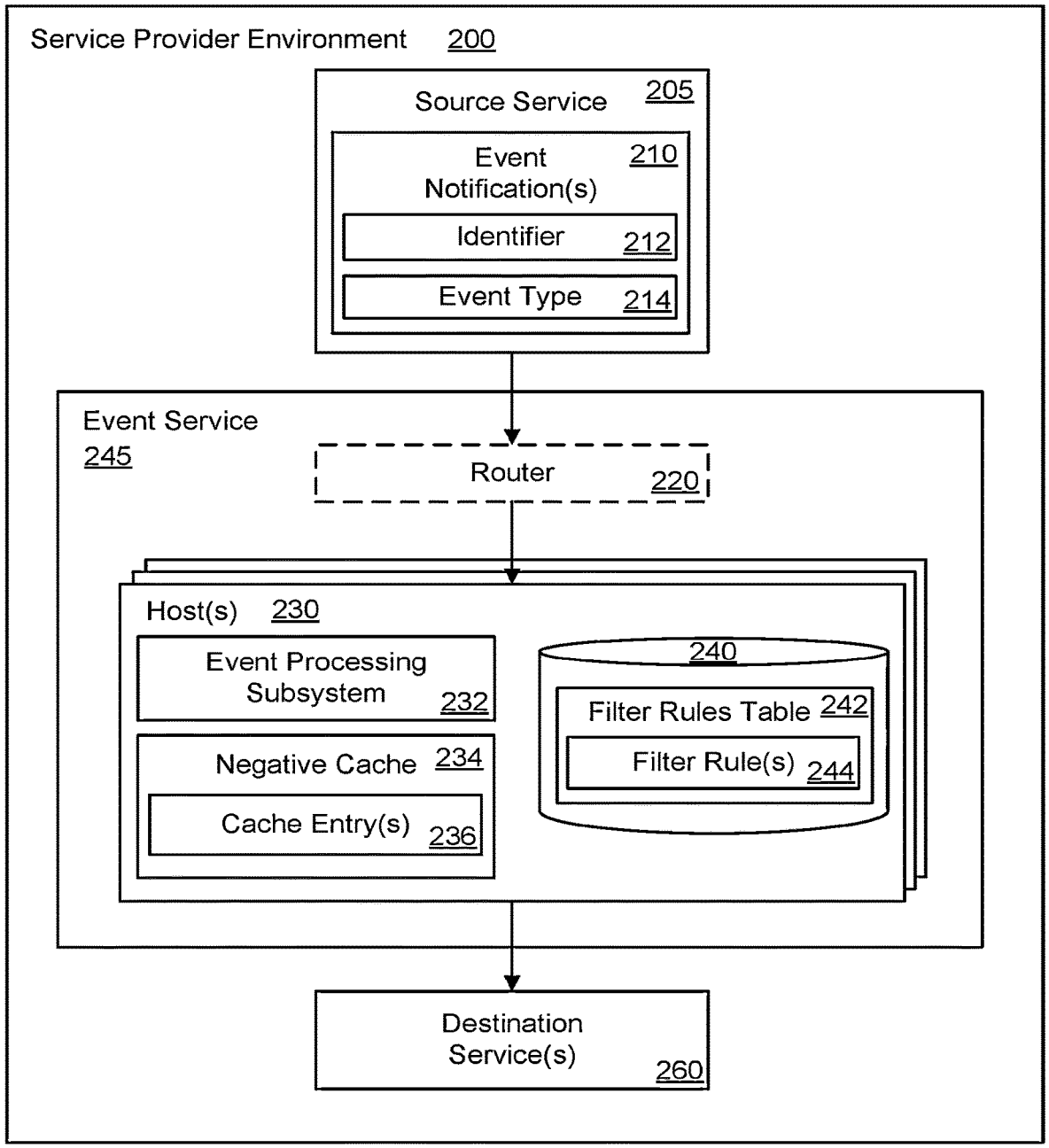
FIG. 2 illustrates a system and related operations for determining whether to drop an event notification at a host based on a presence of a cache entry for the event notification in a negative cache of the host according to an example of the present technology.

FIG. 1 illustrates that certain processing modules or subsystems may be discussed in connection with this technology and these processing modules or subsystems may be implemented as computing services. In one example configuration, a module or subsystem may be considered a service with one or more processes executing on a server or other computer hardware. Such services may be centrally hosted functionality or a service application that may receive requests and provide output to other services or consumer devices. For example, modules or subsystems providing services may be considered on-demand computing that are hosted in a server, virtualized service environment, grid or cluster computing system. An API may be provided for each module or subsystem to enable a second module to send requests to and receive output from the first module. Such APIs may also allow third parties to interface with the module or subsystem and make requests and receive output from the modules or subsystems. While FIG. 2 illustrates an example of a system that may implement the techniques above, many other similar or different environments are possible. The example environments discussed and illustrated above are merely representative and not limiting.

FIG. 2 illustrates an example of a system and related operations for determining whether to drop an event notification 210 at a host 230 based on a presence of a cache entry 236 for the event notification 210 in a negative cache 234 of the host 230. In this configuration, a source service 205 in a service provider environment 200 may generate an event notification 210. The event notification 210 may be associated with an identifier 212 (e.g., an account identifier) and/or an event type 214. The source service 205 may send the event notification 210 to the host 230 of an event service 245 in the service provider environment 200. In one example, the source service 205 may send the event notification 210 directly to the host 230, or alternatively, the source service 205 may send the event notification 210 to the host 230 via a router 220. In this alternative example, the router 220 may be part of the event service 245.

The host 230 may include an event processing subsystem 232 to process the event notification 210 received from the source service 205. For example, the event processing subsystem 232 of the host 230 may search the negative cache 234 associated with the host 230 for a cache entry 236 for the event notification 210. In one example, the event processing subsystem 232 of the host 230 may determine that the negative cache 234 does not include the cache entry 236 for the event notification 210. The event processing subsystem 232 of the host 230 may further determine, based on filter rules 244 in a filter rules table 242 stored in a data store 240, that the event notification 210 does not satisfy at least one of the filter rules 244. The event processing subsystem 232 of the host 230 may update or populate the negative cache 234 to include the cache entry 236 for the event notification 210.

When the event processing subsystem 232 of the host 230 receives a subsequent event notification 210 with a same identifier 212 and/or event type 214 as compared to the earlier received event notification 210, and prior to an expiry of the cache entry 236 in the negative cache 234, the event processing subsystem 232 of the host 230 may determine that the cache entry 236 is in the negative cache 234 and may drop the subsequent event notification 210.

In an alternative example, the event processing subsystem 232 of the host 230 may receive the event notification 210 and determine that the negative cache 234 does not include a cache entry 236 for the event notification 210. The event processing subsystem 232 of the host 230 may further determine, based on the filter rules 244 in the filter rules table 242, that the event notification 210 satisfies at least one of the filter rules 244. In this case, the event processing subsystem 232 of the host 230 may transmit the event notification 210 to a destination service 260.

Figure 3:
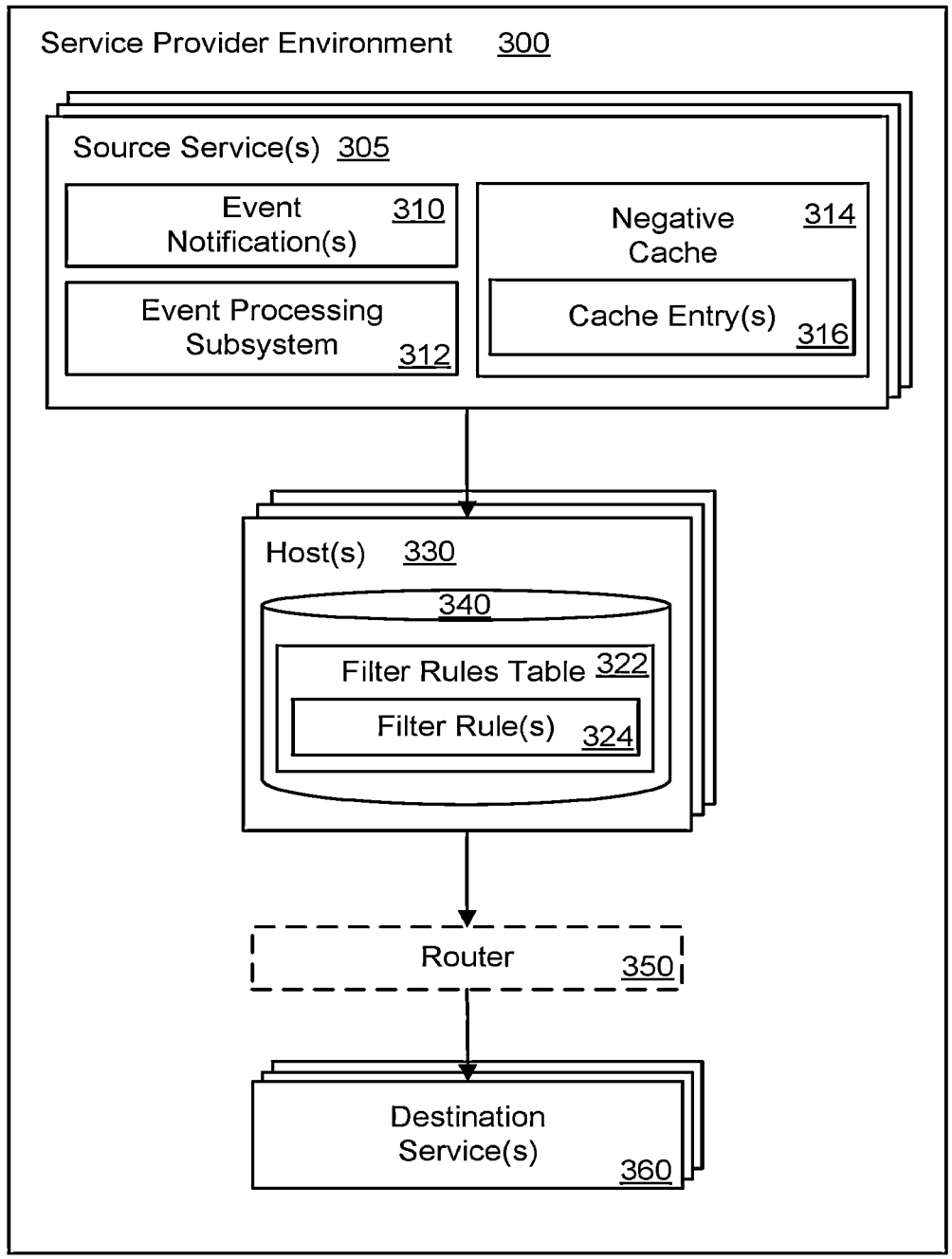
FIG. 3 illustrates a system and related operations for determining whether to drop an event notification at a source service based on a presence of a cache entry for the event notification in a negative cache of the source service according to an example of the present technology.

FIG. 3 illustrates an example of a system and related operations for determining whether to drop an event notification 310 at a source service 305 based on a presence of a cache entry 316 for the event notification 310 in a negative cache 315 of the source service 305. In this configuration, an event processing subsystem 312 of the source service 305 may request a filter rules table 322 having filter rules 324 from a host 330 in a service provider environment 300. For example, the host 330 may include a data store 340 that stores the filter rules table 322 with the filter rules 324. In response to the request, the host 330 may send the filter rules table 322 with the filter rules 324 to the source service 305. The source service 305 may or may not store the filter rules table 322 with the filter rules 324 in a data store accessible to the source service 305.

In this configuration, the event processing subsystem 312 of the source service 305 may receive or detect the event notification 310 generated at the source service 305. The event processing subsystem 312 of the source service 305 may determine whether to send the event notification 310 to a destination service 360 in the service provider environment 300, or alternatively, whether to drop the event notification 310. For example, the event processing subsystem 312 of the source service 305 may search the negative cache 314 of the source service 305 for a presence of a cache entry 316, and depending on whether the negative cache 314 includes the cache entry 316, the event processing subsystem 312 of the source service 305 may update the negative cache 314 to include the cache entry 316, transmit the event notification 310 to the destination service, or drop the event notification 310, as described in FIGS. 1 and 2.

Further, in this configuration, the source service 305 may send event notifications 310 to the destination services 360 through the host 330 and a router 350. The host 330 may provide the filter rules table 322 with the filter rules 324 to the source service 305, which may allow the event processing subsystem 312 of the source service 305 to determine whether to drop or transmit the event notifications 310. Alternatively, the host 330 may locally check the filter rules table 322 and send an indication to the event processing subsystem 312 of whether the event notification 310 is to be dropped or transmitted. In one configuration, the router 350 may be optional, and when the router 350 is not present, the source service 305 may send the event notifications 310 to the host 330, and the event notifications 310 may subsequently be transmitted to the destination service 360.

In the configuration shown in FIG. 3, a negative caching solution may be implemented at the source service 305 based on the source service 305 obtaining the filter rules table 322 with the filter rules 324. In other words, rule matching and negative caching are not performed at the router 350 or the host 330, but rather at the source service 305. The source service 305 may obtain libraries that are used to send event notifications 310, such that event notifications 310 that are not useful at particular destinations may be dropped at the source service 305 without making service calls or requests (or a reduced number of service calls or requests) to the hosts 330 and/or the router 350.

Figure 4:
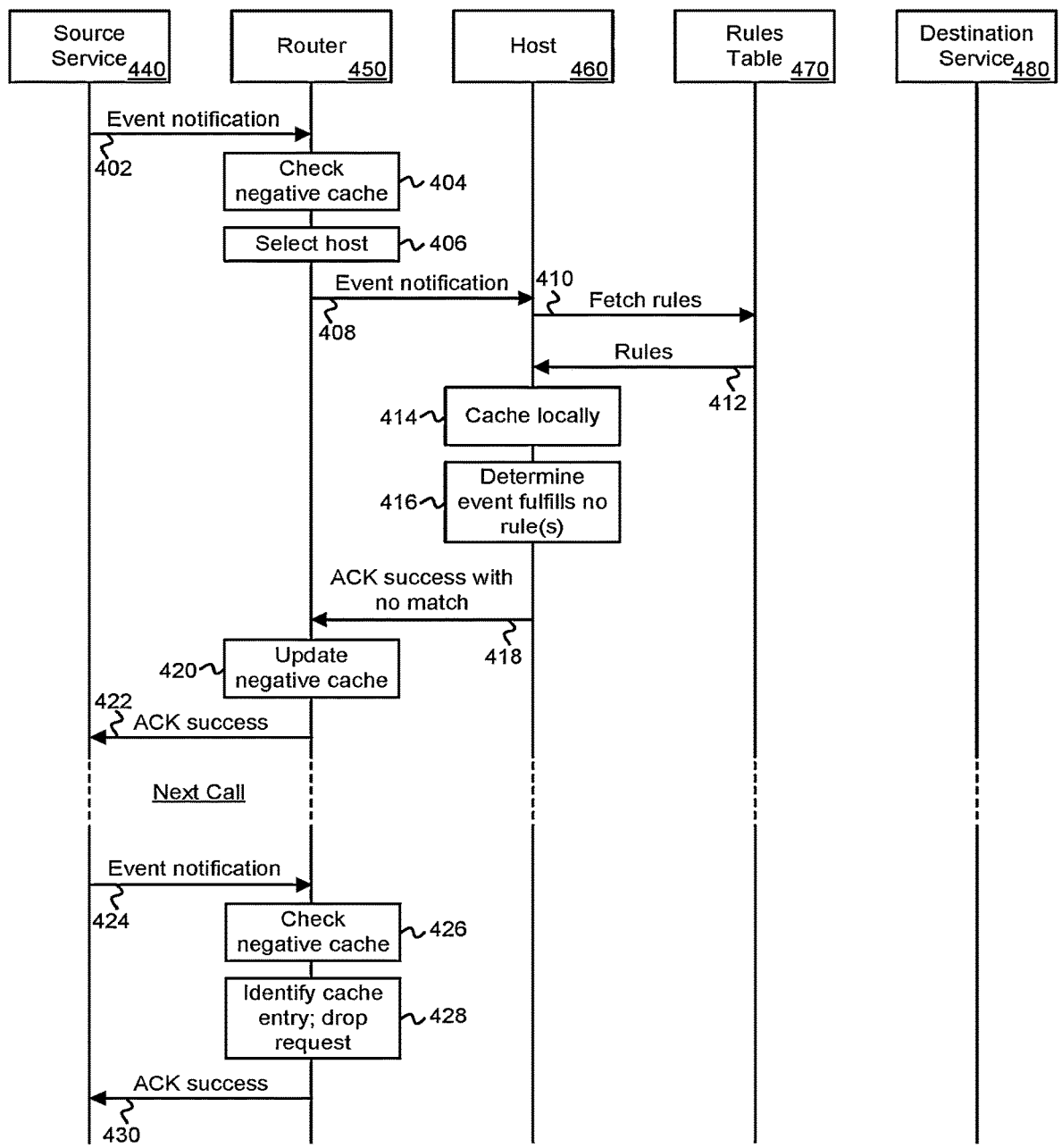
FIG. 4 is a sequence diagram illustrating operations for populating a negative cache with a cache entry for an event notification when the event notification does not satisfy a filter rule according to an example of the present technology.

FIG. 4 is an example of a sequence diagram illustrating operations for populating a negative cache with a cache entry for an event notification when the event notification does not satisfy a filter rule. In action 402, a source service 440 may send an event notification to a router 450. In action 404, the router 450 may search the negative cache and determine that the cache entry is not included in the negative cache. In action 406, the router 450 may select or identify a host 460, and in action 408, the router 450 may send the event notification to the host 460. In action 410, the host 460 may fetch rules from a rules table 470 (e.g., a filter rules table), and in action 412, the rules may be provided to the host 460. In action 414, the host 460 may locally cache the rules. In action 416, the host 460 may determine that the event notification does not satisfy any rules, and the host 460 may not send the event notification to a destination service 480. In action 418, the host 460 may send an acknowledgement message to the router 450 indicating that the event notification does not satisfy any of the rules. In action 420, the router 450 may update the negative cache with a cache entry for the event notification, and in action 422, the router 450 may send an acknowledgement message to the source service 440.

In one example with respect to a next incoming event or message, in action 424, the source service 440 may send a second event notification to the router 450. In action 426, the router 450 may search the negative cache, and in action 428, the router 450 may detect or identify the cache entry in the negative cache and drop the second event notification. In action 430, the router 450 may send an acknowledgement and success message to the source service 440.

Figure 5:
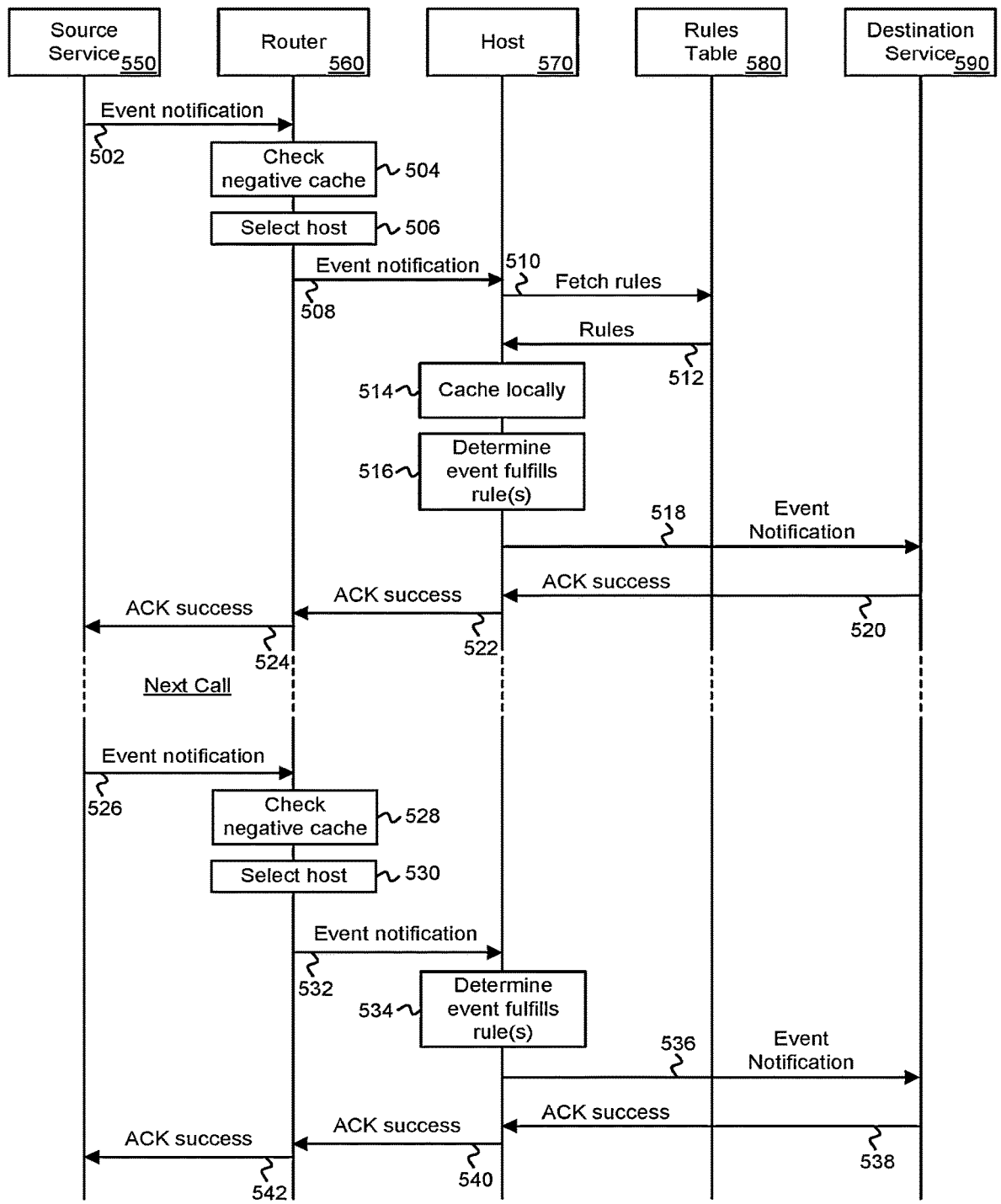
FIG. 5 is a sequence diagram illustrating operations for sending an event notification to a destination when there is no cache entry for the event notification in a negative cache according to an example of the present technology.

FIG. 5 is an example of a sequence diagram illustrating operations for sending an event notification to a destination when there is no cache entry for the event notification in a negative cache. In action 502, a source service 550 may send an event notification or message to a router 560. In action 504, the router 560 may search the negative cache and determine that the cache entry is not included in the negative cache. In action 506, the router 560 may select or identify a host 570, and in action 508, the router 560 may send the event notification to the host 570. In action 510, the host 570 may fetch rules from a rules table 580 (e.g., a filter rules table), and in action 512, the rules may be provided to the host 570. In action 514, the host 570 may locally cache the rules. In action 516, the host 570 may determine that the event notification satisfies rule(s) from the rules table 580, and in action 518, the host 570 may send the event notification to a destination service 590. In action 520, the destination service 590 may send an acknowledgement message to the host 570. In action 522, the host 570 may send an acknowledgement message to the router 560. In action 524, the router 560 may send an acknowledgement message to the source service 550.

In one example with respect to a next call or next message, in action 526, the source service 550 may send a second event notification to the router 560. In action 528, the router 560 may search the negative cache and determine that the cache entry is not included in the negative cache. In action 530, the router 560 may select or identify the host 570. In action 532, the router 560 may send the second event notification to the host 570. In action 534, the host 570 may determine that the second event notification satisfies rule(s) from the rules table 580, and in action 536, the host 570 may send the second event notification to the destination service 590. In action 538, the destination service 590 may send an acknowledgement message to the host 570. In action 540, the host 570 may send an acknowledgement message to the router 560. In action 542, the router 560 may send an acknowledgement message to the source service 550.

Figure 6:
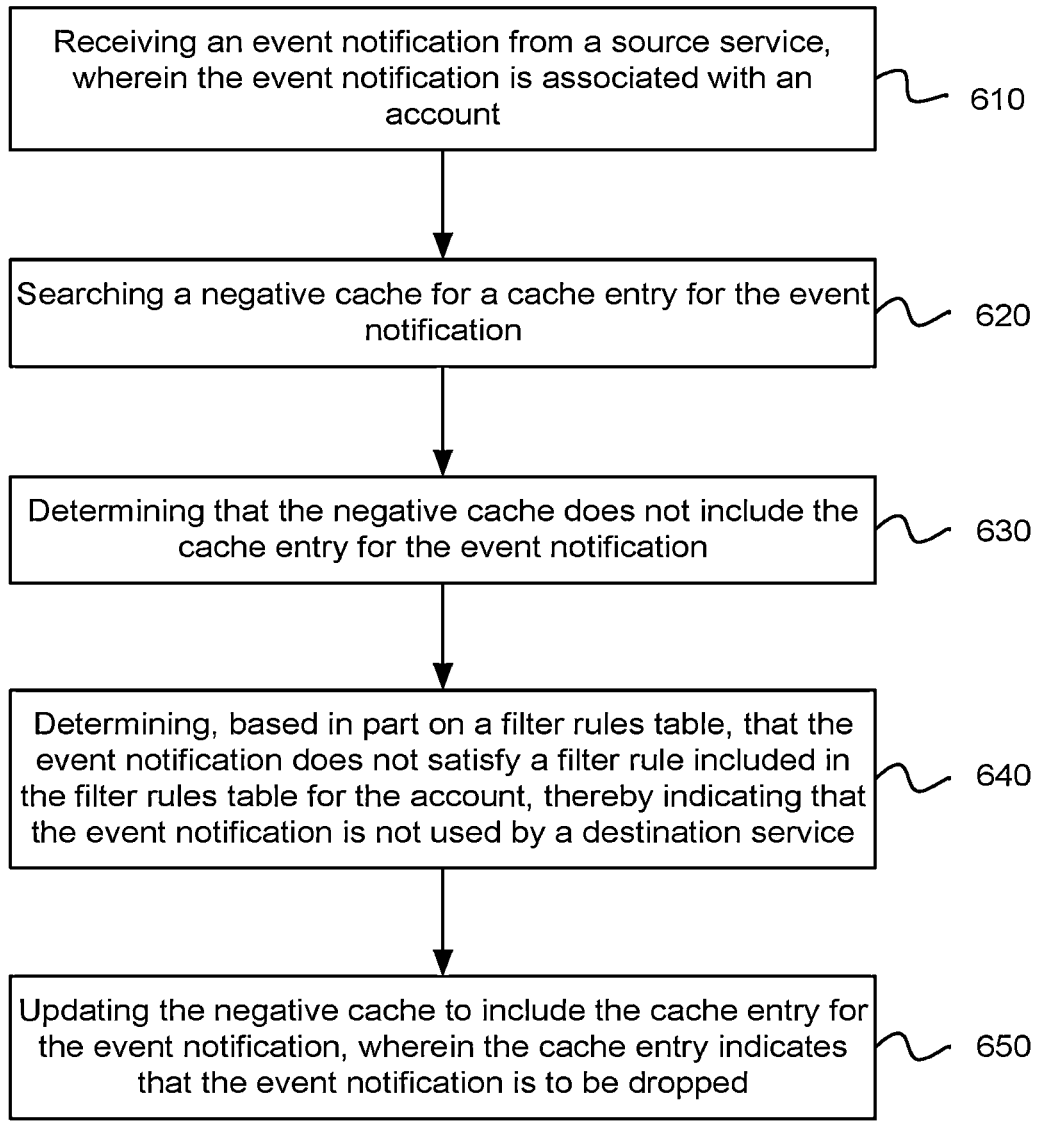
FIG. 6 is a flowchart of an example method for determining that an event notification does not satisfy any filter rule and updating a negative cache to include a cache entry for the event notification.

FIG. 6 illustrates an example of a method for determining that an event notification does not satisfy a filter rule and updating a negative cache to include a cache entry for the event notification. An event notification may be received from a service operating in a service provider environment, as in block 610. The event notification may be received at a router in the service provider environment. As an example, the event notification may be generated in response to a change in a system state in a user environment, such as a change to compute or storage resources in the user environment. As another example, the event notification may indicate that an action was performed using a service in the service provider environment. For example, the event notification may indicate that data has been retrieved or accessed from a data store of a storage service in response to a read request. In addition, the event notification may be associated with an identifier, such as an account identifier, application identifier, service identifier or generated identifier.

A negative cache may be searched or checked for a cache entry for the event notification, as in block 620. For example, the negative cache may be associated with the router, and the router may search the negative cache to determine a presence of the cache entry for the event notification.

The negative cache may be determined to not include the cache entry for the event notification, as in block 630. For example, the router may search the negative cache for the cache entry and determine when no cache entry for the event notification is present in the negative cache.

The event notification may be determined to not satisfy a filter rule included in a filter rules table for the identifier, as in block 640. For example, the filter rules table may include a plurality of filter rules, and the event notification may be determined to not satisfy (e.g., match) one or more filter rules included in the filter rules table for the identifier. In one example, the router may determine that the event notification does not satisfy a filter rule, or alternatively, the router may receive an acknowledgement from a host in the service provider environment indicating that the event notification does not satisfy a filter rule. The event notification may not satisfy a filter rule and thus forwarding or sending the event notification through the system may be considered wasteful. For example, the event notification may not satisfy a filter rule when the event notification is not expected to be used at a destination, and as a result, a transmission of the event notification to the destination may unnecessarily increase a computing load, network load, storage load or other computing load in the service provider environment.

The negative cache may be updated to include the cache entry for the event notification, as in block 650. A presence of the cache entry in the negative cache may indicate that further processing of the event notification is wasteful since the event notification is to be dropped. The cache entry may be stored in the negative cache until a timeout period has expired, at which point the cache entry may be removed from the negative cache.

Figure 7:
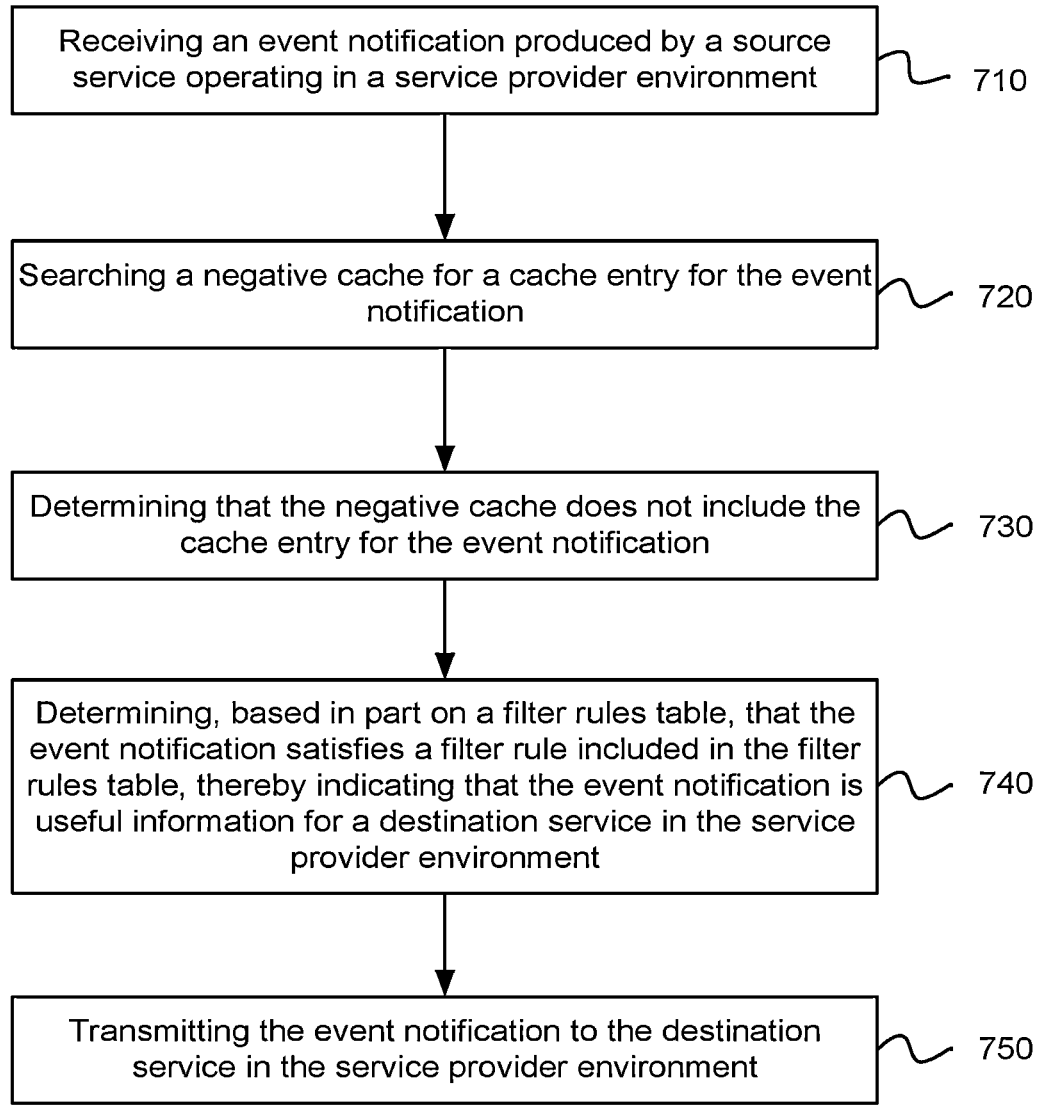
FIG. 7 is a flowchart of an example method for sending an event notification to a destination when there is no cache entry for the event notification in a negative cache.

FIG. 7 illustrates an example of a method for sending an event notification to a destination when there is no cache entry for the event notification in a negative cache. An event notification produced by a source service operating in a service provider environment may be received, as in block 710. The event notification may be associated with an identifier, an event type, a date, a time or a geographic location. In one example, the event notification may be received at a router in the service provider environment or a computing network. In another example, the event notification may be received at a host of an event service of the service provider environment.

A negative cache may be searched for a cache entry for the event notification, as in block 720. In one example, the negative cache may be associated with the router. In another example, the negative cache may be associated with the host. In yet another example, the negative cache may be associated with the source service.

The negative cache may be determined to not include the cache entry for the event notification, as in block 730. For example, the router, the host or the source service, depending on a location of the negative cache, may search the negative cache for the cache entry and determine when no cache entry for the event notification is present in the negative cache.

The event notification may be determined to satisfy a filter rule included in a filter rules table, as in block 740. For example, the filter rules table may include a plurality of filter rules, and the event notification may be determined to satisfy one or more filter rules included in the filter rules table. The determination that the event notification satisfies a filter rule may be made at the router, the host or the source service. The event may satisfy a filter rule included in the filter rules table for the identifier, the event type or the geographic location. The event notification may satisfy a filter rule when the event notification is considered to be useful information for a destination service in the service provider environment. For example, the event notification may satisfy a filter rule when the event notification is expected to be used at the destination service, and as a result, a transmission of the event notification would not unnecessarily increase a resource utilization in the service provider environment or computing network.

The event notification may be transmitted to the destination service in the service provider environment, as in block 750. For example, the event notification may be transmitted from a router to a host in an event service in the service provider environment. The event notification may be transmitted from the host to the destination service.

Figure 8:
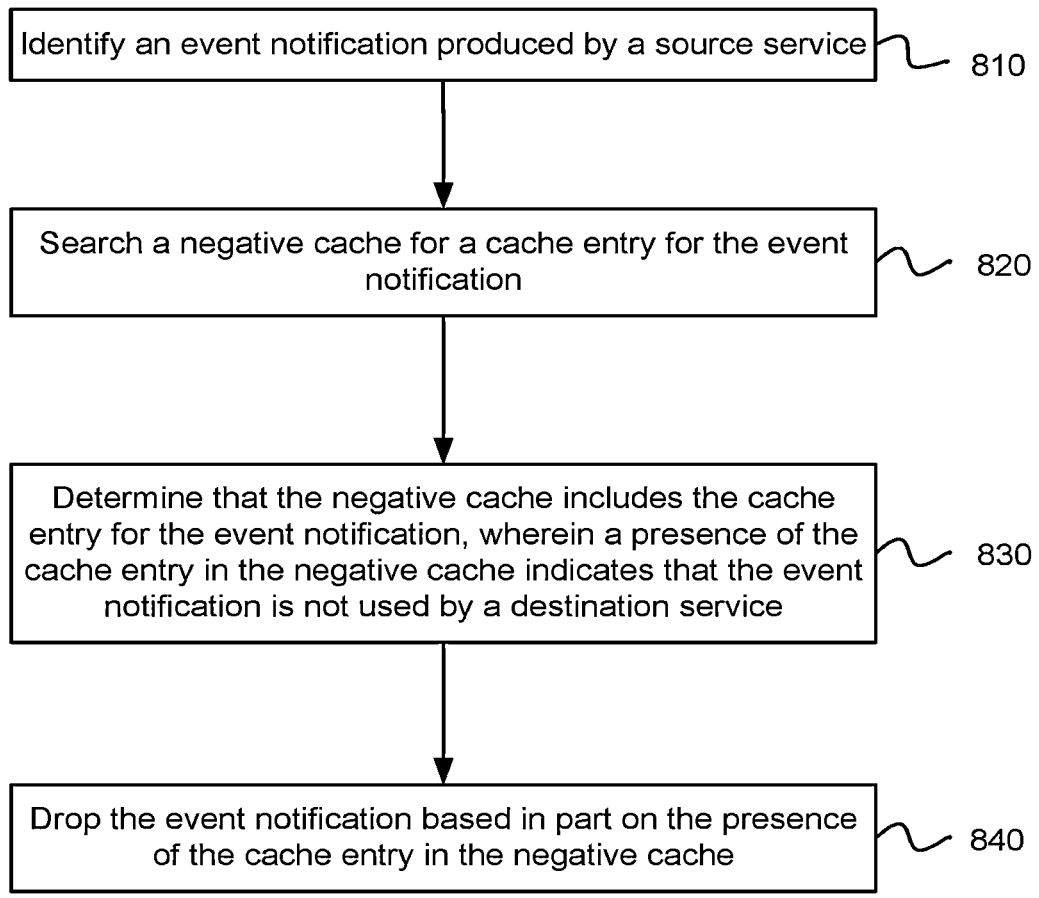
FIG. 8 is a flowchart of an example method for dropping an event notification when there is a cache entry for the event notification in a negative cache.

FIG. 8 illustrates an example of a method for dropping an event notification when there is a cache entry for the event notification in a negative cache. An event notification produced by a source service operating in a service provider environment may be identified at a computing node, as in block 810. The event notification may be associated with an identifier, an event type, a date, a time or a geographic location. In one example, the computing node may be a router in the service provider environment. In another example, the computing node may be a host of an event service in the service provider environment. In yet another example, the computing node may be included in the source service operating in the service provider environment, where the service may be a source service.

A negative cache at the computing node may be searched for a cache entry for the event notification, as in block 820. For example, the computing node may search the negative cache to determine a presence of the cache entry for the event notification.

The negative cache may be determined to include the cache entry for the event notification, as in block 830. A presence of the cache entry in the negative cache may indicate that the event notification may incur wasteful processing and communications. For example, the presence of the cache entry in the negative cache may indicate that the event notification is not expected to be used at a destination, and as a result, a transmission of the event notification to the destination may unnecessarily increase a computing load in the service provider environment. In one example, the cache entry may have been previously created for inclusion in the negative cache when an earlier received event notification did not satisfy a filter rule included in a filter rules table.

The event notification may be dropped at the computing node based in part on the presence of the cache entry in the negative cache, as in block 840. For example, rather than transmitting the event notification to the destination, which may simply discard or delete the event notification after receipt without using the event notification to satisfy an objective, the computing node may drop the event notification without sending the event notification or message on to another computing node. As a result, network resources may be saved and a network load in the service provider environment may be reduced.

Figure 9:
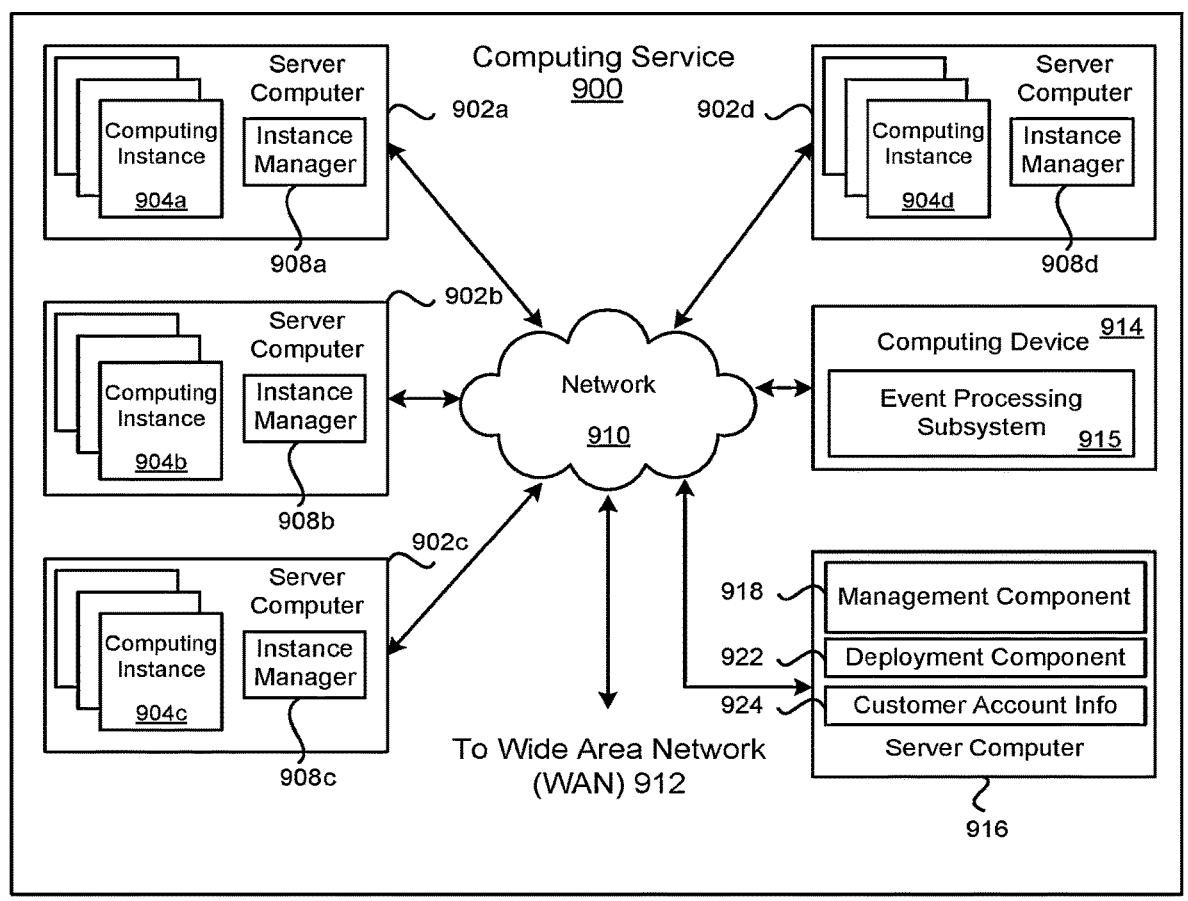
FIG. 9 is a block diagram of a service provider environment according to an example of the present technology.

FIG. 9 is a block diagram illustrating an example computing service 900 that may be used to execute and manage a number of computing instances 904a-d upon which the present technology may execute. In particular, the computing service 900 depicted illustrates one environment in which the technology described herein may be used. The computing service 900 may be one type of environment that includes various virtualized service resources that may be used, for instance, to host computing instances 904a-d.

The computing service 900 may be capable of delivery of computing, storage and networking capacity as a software service to a community of end recipients. In one example, the computing service 900 may be established for an organization by or on behalf of the organization. That is, the computing service 900 may offer a "private cloud environment." In another example, the computing service 900 may support a multi-tenant environment, wherein a plurality of customers may operate independently (i.e., a public cloud environment). Generally speaking, the computing service 900 may provide the following models: Infrastructure as a Service ("IaaS") and/or Software as a Service ("SaaS"). Other models may be provided. For the IaaS model, the computing service 900 may offer computers as physical or virtual machines and other resources. The virtual machines may be run as guests by a hypervisor, as described further below. The PaaS model delivers a computing system that may include an operating system, programming language execution environment, database, and web server.

Application developers may develop and run their software solutions on the computing service system without incurring the cost of buying and managing the underlying hardware and software. The SaaS model allows installation and operation of application software in the computing service 900. End customers may access the computing service 900 using networked client devices, such as desktop computers, laptops, tablets, smartphones, etc. running web browsers or other lightweight client applications, for example. Those familiar with the art will recognize that the computing service 900 may be described as a "cloud" environment.

The particularly illustrated computing service 900 may include a plurality of server computers 902a-d. The server computers 902a-d may also be known as physical hosts. While four server computers are shown, any number may be used, and large data centers may include thousands of server computers. The computing service 900 may provide computing resources for executing computing instances 904a-d. Computing instances 904a-d may, for example, be virtual machines. A virtual machine may be an instance of a software implementation of a machine (i.e. a computer) that executes applications like a physical machine. In the example of a virtual machine, each of the server computers 902a-d may be configured to execute an instance manager 908a-d capable of executing the instances. The instance manager 908a-d may be a hypervisor, virtual machine manager (VMM), or another type of program configured to enable the execution of multiple computing instances 904a-d on a single server. Additionally, each of the computing instances 904a-d may be configured to execute one or more applications.

A computing device 914 may be reserved to execute software components for implementing the present technology or managing the operation of the computing service 900 and the computing instances 904a-d. For example, the computing device 914 may include an event processing subsystem 915 operable to receive an event notification from a service operating in the computing service 900. The event notification may be associated with an identifier. The event processing subsystem 915 may search a negative cache for a cache entry for the event notification. The event processing subsystem 915 may determine that the negative cache does not include the cache entry for the event notification. The event processing subsystem 915 may determine, based in part on a filter rules table, when the event notification does not satisfy a filter rule included in the filter rules table for the identifier. The event processing subsystem 915 may update the negative cache to include the cache entry for the event notification.

A server computer 916 may execute a management component 918. A customer may access the management component 918 to configure various aspects of the operation of the computing instances 904a-d purchased by a customer. For example, the customer may setup computing instances 904a-d and make changes to the configuration of the computing instances 904a-d.

A deployment component 922 may be used to assist customers in the deployment of computing instances 904a-d. The deployment component 922 may have access to account information associated with the computing instances 904a-d, such as the name of an owner of the account, credit card information, country of the owner, etc. The deployment component 922 may receive a configuration from a customer that includes data describing how computing instances 904a-d may be configured. For example, the configuration may include an operating system, provide one or more applications to be installed in computing instances 904a-d, provide scripts and/or other types of code to be executed for configuring computing instances 904a-d, provide cache logic specifying how an application cache is to be prepared, and other types of information. The deployment component 922 may utilize the customer-provided configuration and cache logic to configure, prime, and launch computing instances 904a-d. The configuration, cache logic, and other information may be specified by a customer accessing the management component 918 or by providing this information directly to the deployment component 922.

Customer account information 924 may include any desired information associated with a customer of the multi-tenant environment. For example, the customer account information may include a unique identifier for a customer, a customer address, billing information, licensing information, customization parameters for launching instances, scheduling information, etc. As described above, the customer account information 924 may also include security information used in encryption of asynchronous responses to API requests. By "asynchronous" it is meant that the API response may be made at any time after the initial request and with a different network connection.

A network 910 may be utilized to interconnect the computing service 900 and the server computers 902a-d, 916. The network 910 may be a local area network (LAN) and may be connected to a Wide Area Network (WAN) 912 or the Internet, so that end customers may access the computing service 900. In addition, the network 910 may include a virtual network overlaid on the physical network to provide communications between the servers 902a-d. The network topology illustrated in FIG. 9 has been simplified, as many more networks and networking devices may be utilized to interconnect the various computing systems disclosed herein.

Figure 10:
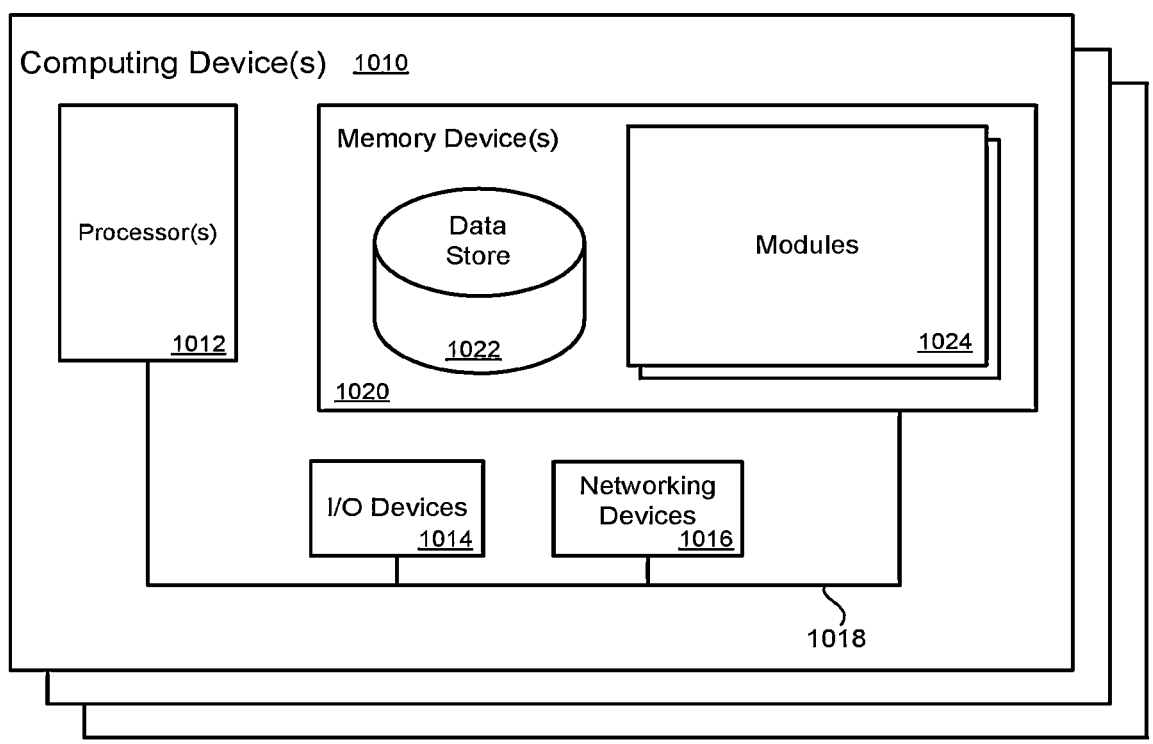
FIG. 10 is a block diagram that provides an example illustration of a computing device that may be employed in the present technology.

FIG. 10 illustrates a computing device 1010 on which modules of this technology may execute. The computing device 1010 is illustrated on which a high level example of the technology may be executed. The computing device 1010 may include one or more processors 1012 that are in communication with memory devices 1020. The computing device may include a local communication interface 1018 for the components in the computing device. For example, the local communication interface may be a local data bus and/or any related address or control busses as may be desired.

The memory device 1020 may contain modules 1024 that are executable by the processor(s) 1012 and data for the modules 1024. The modules 1024 may execute the functions described earlier. A data store 1022 may also be located in the memory device 1020 for storing data related to the modules 1024 and other applications along with an operating system that is executable by the processor(s) 1012.

Other applications may also be stored in the memory device 1020 and may be executable by the processor(s) 1012. Components or modules discussed in this description that may be implemented in the form of software using high programming level languages that are compiled, interpreted or executed using a hybrid of the methods.

The computing device may also have access to I/O (input/output) devices 1014 that are usable by the computing devices. An example of an I/O device is a display screen that is available to display output from the computing devices. Other known I/O device may be used with the computing device as desired. Networking devices 1016 and similar communication devices may be included in the computing device. The networking devices 1016 may be wired or wireless networking devices that connect to the internet, a LAN, WAN, or other computing network.

The components or modules that are shown as being stored in the memory device 1020 may be executed by the processor 1012. The term "executable" may mean a program file that is in a form that may be executed by a processor 1012. For example, a program in a higher level language may be compiled into machine code in a format that may be loaded into a random access portion of the memory device 1020 and executed by the processor 1012, or source code may be loaded by another executable program and interpreted to generate instructions in a random access portion of the memory to be executed by a processor. The executable program may be stored in any portion or component of the memory device 1020. For example, the memory device 1020 may be random access memory (RAM), read only memory (ROM), flash memory, a solid state drive, memory card, a hard drive, optical disk, floppy disk, magnetic tape, or any other memory components.

The processor 1012 may represent multiple processors and the memory 1020 may represent multiple memory units that operate in parallel to the processing circuits. This may provide parallel processing channels for the processes and data in the system. The local interface 1018 may be used as a network to facilitate communication between any of the multiple processors and multiple memories. The local interface 1018 may use additional systems designed for coordinating communication such as load balancing, bulk data transfer, and similar systems.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here can also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which can be used to store the desired information and described technology.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology can be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements can be devised without departing from the spirit and scope of the described technology.

What is claimed is:

1. A system comprising:
   a data store configured to store computer-executable instructions; and
   one or more processors corresponding to an event service and in communication with the data store, wherein the computer-executable instructions, when executed by the one or more processors, configure the one or more processors to perform operations including:
      obtaining, at the event service, a first event notification generated by a source service, wherein the first event notification is associated with a first event;
      in response to a determination that a negative cache does not contain a cache entry corresponding to the first event notification;
      applying a set of filter rules to the first event notification to further determine whether a destination service consumes the first event notification to perform an action or a task based on executing a code function by the destination service hosted in a service provider environment, wherein the set of filter rules are defined by a user; and
      in response to a determination that the application of the set of filter rules indicate that the destination service does not consume the first event notification based on executing a code function:
         storing a cache entry corresponding to the first event notification in the negative cache; and
         dropping the first event notification.

2. The system of claim 1, wherein the first event is associated with an event type.

3. The system of claim 2, wherein the data store is configured to store further computer-executable instructions that, when executed by the one or more processors, configure the one or more processors to perform further operations including:
   obtaining a second event notification associated with the event type; and
   in response to a determination that the negative cache contains the cache entry corresponding to the first event notification, dropping the second event notification.

4. The system of claim 3, wherein the second event notification is generated by the source service.

5. The system of claim 2, wherein the determination that no destination service uses the first event notification comprises a determination that no destination service uses event notifications associated with the event type.

6. The system of claim 2, wherein the set of filter rules includes a filter rule associated with the event type.

7. A computer-implemented method comprising:
   obtaining a first event notification generated by a source service;
   in response to a determination that a negative cache does not contain a cache entry corresponding to the first event notification:
      determining, based at least in part on a set of filter rules, whether any of a plurality of destination services consumes the first event notification to perform an action or a task based on executing a code function by any of the plurality of the destination services hosted in a service provider environment, wherein the set of filter rules defined by a user; and
   in response to a determination that none of the plurality of destination services consumes the first event notification based on executing a code function:
      storing a cache entry corresponding to the first event notification in the negative cache; and
      dropping the first event notification.

8. The computer-implemented method of claim 7 further comprising determining that an update to the set of filter rules indicates that at least one destination service of the plurality of destination services will use the first event notification.

9. The computer-implemented method of claim 7 further comprising removing the cache entry corresponding to the first event notification in the negative cache.

10. The computer-implemented method of claim 7, wherein the determination that none of the plurality of destination services use the first event notification is made based at least in part on applying a machine learning model trained to identify unused event notifications.

11. The computer-implemented method of claim 7 further comprising transmitting an acknowledgement of the first event notification to the source service.

12. The computer-implemented method of claim 7, wherein individual rules of the set of filter rules identify one or more destination services of the plurality of destination services, and wherein the individual rules of the set of filter rules identify event notifications that the one or more destination services are expected to use.

13. The computer-implemented method of claim 7, wherein a first filter rule of the set of filter rules specifies one or more of a percentage of event notifications, a number of event notifications per defined time period, or a time of day.

14. The computer-implemented method of claim 7, wherein the first event notification is generated in response to an action performed by the source service.

15. The computer-implemented method of claim 7 further comprising determining that the negative cache does not contain the cache entry corresponding to the first event notification.

16. A non-transitory computer-readable storage medium having instructions embodied thereon, wherein the instructions, when executed by one or more processors, cause the one or more processors to perform operations including:
   obtaining a first event notification generated by a source service;
   in response to a determination that a negative cache does not contain a cache entry corresponding to the first event notification:
      determining, based at least in part on application of a set of filter rules, whether to transmit the first event notification to any of a plurality of destination services, wherein application of the set of filter rules determine whether any of the plurality of destination services consume event notifications to perform an action or a task based on executing a code function by any of the plurality of destination services hosted in a service provider environment; and in response to a determination not to transmit the first event notification to any of the plurality of destination services:

storing a cache entry corresponding to the first event notification in the negative cache; and dropping the first event notification.

17. The non-transitory computer-readable storage medium of claim 16, wherein the determination not to transmit the first event notification to any of the plurality of destination services comprises a determination that none of the plurality of destination services are expected to use the first event notification.

18. The non-transitory computer-readable storage medium of claim 16, wherein the determination not to transmit the first event notification to any of the plurality of destination services is based at least in part on data traffic conditions.

19. The non-transitory computer-readable storage medium of claim 16, wherein the plurality of destination services include one or more of an analytics service, a fraud detection service, or a service that executes code that consumes the first event notification.

20. The non-transitory computer-readable storage medium of claim 16 having further instructions embodied thereon, wherein the further instructions, when executed by the one or more processors, cause the one or more processors to perform further operations including:

removing the cache entry corresponding to the first event notification from the negative cache after a user-specified timeout period has elapsed.

* * * * *